United States Patent [19]

Cauwet

[11] Patent Number: 4,972,323
[45] Date of Patent: Nov. 20, 1990

[54] AUTOMATIC ENGRAVING SYSTEMS AND METHOD

[75] Inventor: Claude M. Cauwet, Boulogne Billancourt, France

[73] Assignee: Roger LeCren, Nogent sur Marne, France; a part interest

[21] Appl. No.: 496,053

[22] Filed: Mar. 16, 1990

Related U.S. Application Data

[63] Continuation-in-part of Ser. No. 376,913, Jul. 3, 1989, abandoned, which is a continuation of Ser. No. 135,687, Dec. 21, 1987, abandoned.

[30] Foreign Application Priority Data

Dec. 23, 1986 [FR] France ............................. 86 18069

[51] Int. Cl.$^5$ ................. B23C 3/13; G05B 19/39; G06K 15/22
[52] U.S. Cl. ....................... 364/474.29; 358/299; 364/474.26; 364/474.02
[58] Field of Search ............... 364/474.02, 474.03, 364/474.04, 474.05, 474.22, 474.26, 474.29, 474.31, 514, 520; 358/101, 299; 33/1 M

[56] References Cited

U.S. PATENT DOCUMENTS

| | | |
|---|---|---|
| 4,385,360 | 5/1983 | Yamada et al. ...................... 364/514 |
| 4,437,150 | 3/1984 | Dahlgren, Jr. et al. ........ 364/474.02 |
| 4,530,061 | 7/1985 | Henderson et al. ............. 364/474.25 |
| 4,575,805 | 3/1986 | Moermann et al. ............. 364/474.05 |
| 4,625,410 | 12/1986 | Eder ..................................... 33/1 M |
| 4,630,309 | 12/1986 | Karow .................................. 382/56 |

Primary Examiner—Felix D. Gruber
Attorney, Agent, or Firm—Dodge, Bush & Moseley

[57] ABSTRACT

Disclosed is a method making use of a video camera, a programmed computer and a numerically-controlled machine-tool with three displacement axes. Particular transitions of the gray levels of the digitized output signal of the camera are sought. Two contiguous binary signals thus produced define a primitive segment of a line to be engraved. The directing parameters of the line segments, normalized in accordance with the displacement step of the machine, are produced and the successions of digital signals controlling the horizontal movement of the machine are deduced therefrom. The engraving depth control signals are renewed with each new engraving pass.

Application to the customized production of jewelry and object-words.

7 Claims, 6 Drawing Sheets

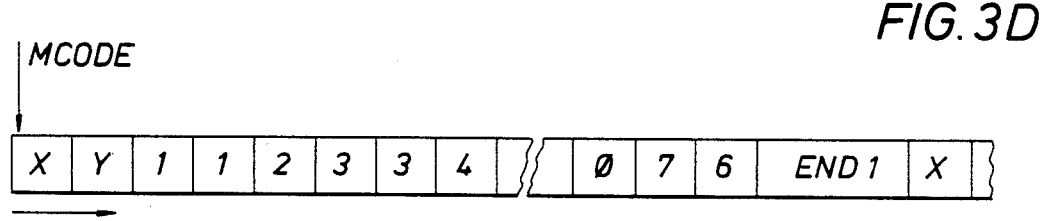
FIG. 3D
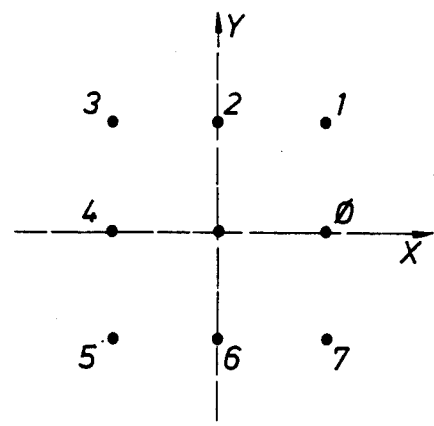
FIG. 3E
FIG. 4A
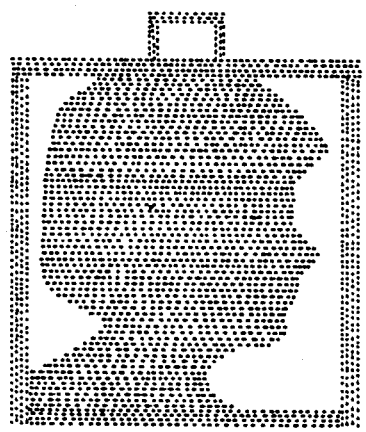
FIG. 4B
FIG. 4C

AUTOMATIC ENGRAVING SYSTEMS AND METHOD

This application is a continuation-in-part of application Ser. No. 376,913, filed 7/3/89, which was a continuation of application Ser. No. 135,687, filed Dec. 21, 1987, both now abandoned.

The invention relates to improvements in systems and methods used for the automatic engraving and/or cutting of small ornamental or utility objects.

BACKGROUND OF THE INVENTION

More recent automatic engraving methods involve the use of a numerically-controlled machine-tool with three working axes. For this purpose, the machine is equipped with a fine engraving tool chosen according to the material of the blank to be engraved. In such a machine, drive motors for the relative movements of the blank and tool are generally: stepping motors (with an open-loop control). The digital control signals of this machine are pulses of a given frequency, each pulse being designed to move the blank or the tool by one step along the horizontal axes X and Y and, when needed, along the vertical axis Z. The basic displacement step of the blank and/or the tool of precision machine-tools used in automatic engraving is generally equal to no more than one-hundredth of a millimeter.

In addition to computer-aided-design stations, the facilities generally used to produce such digital signals make use of a digitizing table associated with a computer. With such systems the operator can, by means of a drawing point, following the distinctive lines of the model to be reproduced, convert these lines into digital signals representative of the relative horizontal movements of the tool and of the blank to be engraved and then store these signals in the computer memory. Such means are altogether suitable for the automatic engraving of objects involving relatively simple graphic patterns. However, in the case of more complex models (for example, the features of a human face), the operator must have, in addition, certain artistic skills to be able to complete the model, first of all, and then follow the lines accurately with the drawing point. The engraving quality achieved will depend more on the skills of the operator than on anything else. Such a precondition obviously constitutes a significant impediment to the use of such an automatic engraving method for the production of objects with a faithful representation of a particular subject.

To cope with this particular difficulty, an automatic engraving method described in the U.S. Pat. No. 4,385,360 granted in 1983 to Yamada et al proposes the automatic entry of data relative to the image of the subject to be reproduced and, for this purpose, the use of a video camera associated with an analog-digital converter. This method is however limited in that it does not enable the manufacture of objects of a quality comparable to that obtained using the previously described method. In fact, in the method of the cited patent, engraving is carried out by means of a large tapered-head milling cutter and is designed to produce as hollows, in a generally transparent plastic blank, a limited number of points with a diameter varying according to the gray levels of the corresponding points of the image of the subject presented to the camera. Although relatively faithful, the result is of poor esthetic quality. On the other hand, with the automatic engraving method using a digitizing table, with a skilled operator, good manual data entry is possible thus allowing the engraving of continuous lines faithfully reproducing the distinctive lines of contours and contrasts in the image of the subject to be represented. This is moreover done on any flat, opaque or transparent substrate.

SUMMARY OF THE INVENTION

The object of the invention is to provide a new automatic engraving method making it possible to overcome the drawbacks specific to the two prior-art methods described above while conserving the advantages of each.

More precisely, the invention provides improvements in automatic engraving methods enabling the unit manufacture at moderate cost, and without requiring special skills, of small ornamental or utility objects involving the faithful representation of distinctive features (lines of contours and/or contrasts) of any subject.

The invention accordingly provides a method for the automatic engraving of small objects requiring the faithful representation of distinctive features of a given subject. In this method, the image of the subject concerned is scanned and primary series of digital signals representative of the scanned pixel lines are produced and stored and then processed to produce secondary series of signals representative of the image to be engraved. Then, said secondary series of signals are processed in turn to produce sequences of digital orders for controlling the relative movements of a blank and of an engraving tool mounted on a numerically-controlled precision machine-tool having at least two displacement axes. The method is characterized in that the signals making up said secondary series of signals are binary signals corresponding to particular transitions of the gray levels of said primary series, two adjacent binary signals defining a primitive segment of a distinctive line or contour to be engraved, and in that said tool produces thin strokes. The said sequences of digital orders comprise dual sequences of pulses for controlling the two basic horizontal X and Y movements of said blank or tool. Each of said dual sequences of orders corresponds to the succession of the primitive segments of a distinctive line or contour to be engraved.

In such a method, the primary series of digital signals will be produced by means of a digital image input device such as an optical scanner or a video camera associated with an image digitizing system. As for the tool to be used, it will be of a type (milling cutter, engraving chisel, laser emitter, electro-erosion tool, etc.) suited to the material of the blank (precious or other metal, wood, mother of pearl, plastic, etc.), this blank being flat.

Thanks to this method, any operator on a numerically controlled engraving machine can, without having any artistic skills, at low cost and on a custom basis, produce small engraved and/or cut ornamental or utility objects with the faithful representation of distinctive features of any subject proposed by a customer. Such a subject may be, for example, the portrait of a person in a photograph and, more generally, any drawing, painting, photograph or radiograph having contrasts.

The features and advantages of the invention will appear more precisely from the following description of a particular embodiment given with reference to the appended drawings.

BRIEF DESCRIPTION OF THE DRAWINGS

FIG. 3D represents the codes arrangement used in FIG. 3B and FIG. 3E illustrates the definitions of said codes; and FIG. 4 represents, at A, B and C, three medals produced with the engraving method of FIG. 2.

DETAILED DESCRIPTION OF THE PREFERRED EMBODIMENTS

Figure 1:
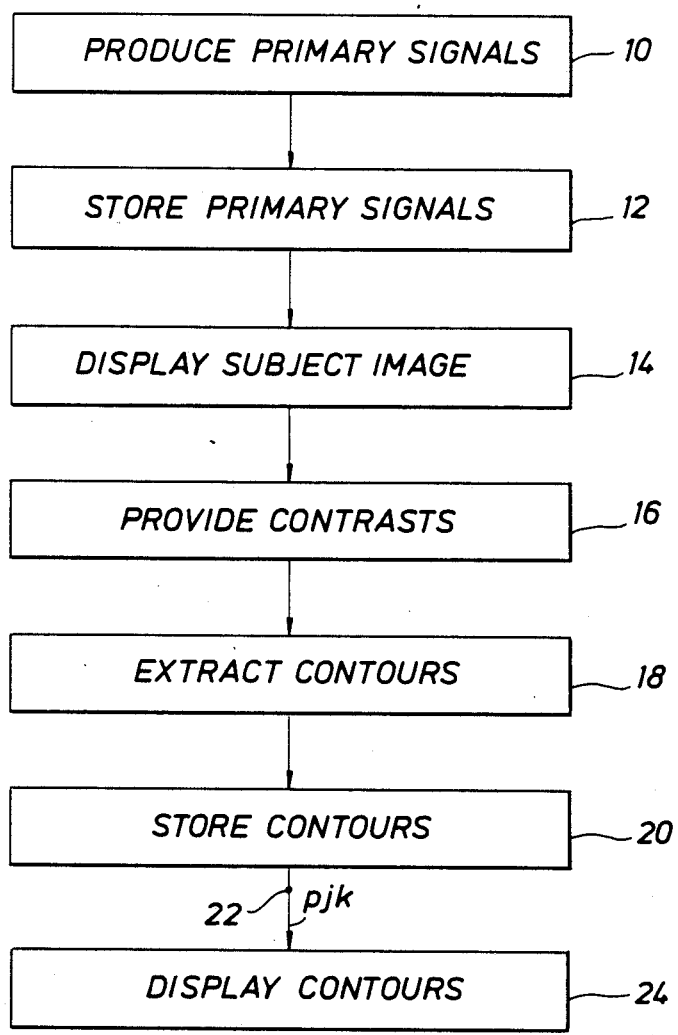
FIG. 1 represents the diagram of the functional stages of the first main phase of the engraving method according to the invention.

Referring to FIG. 1, the first phase of the automatic engraving method according to the invention comprises, in its most general expression, the following series of functional stages most of them being implemented by means of a microcomputer. At 10 "Produce Primary Signals", the method begins producing digital signals representative of the pixels of the image of the subject concerned; at 12 "Store Primary Signals"; at 14 "Display Subject Image"; at 16 "Produce Contrasts"; at 18 "Extract Contours" and at 20, "Store Contours"; stage 20 stores in bit mapping the coordinates (xjk, yjk) of the j primitive pixels pjk of each of the k distinctive lines and contours of the image of the subject to be engraved, such pixels, segments, lines and contours being displayed at stage 24.

Figure 1A:
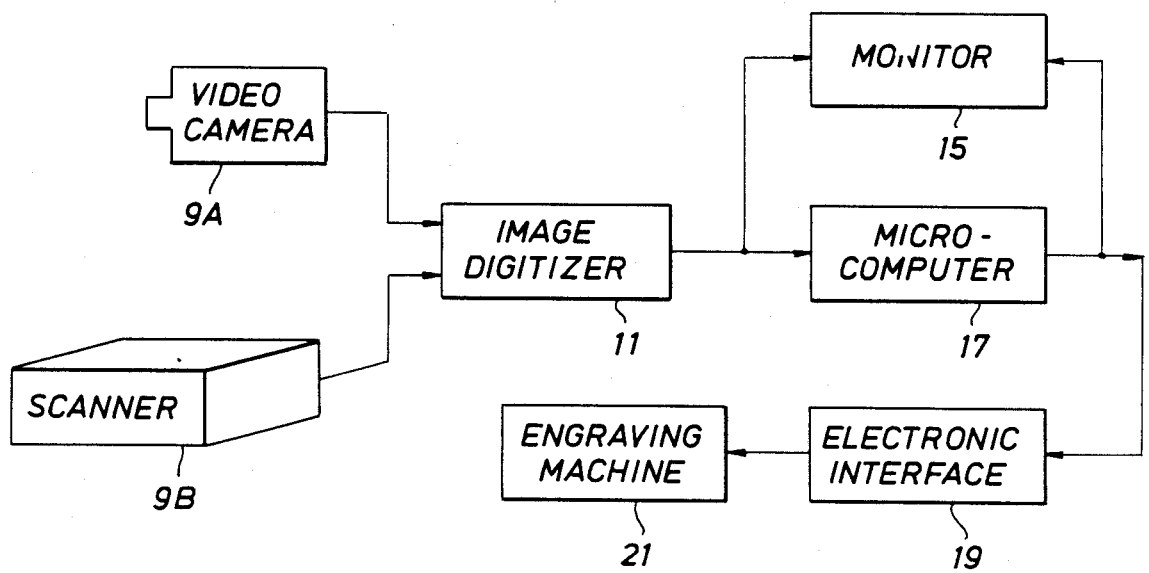
FIG. 1A shows the means used for implementing the functions of the functional stages of FIGS. 1 and 2.

Referring now to FIG. 1A, means for producing primary signals referenced as logic box 10 of FIG. 1 comprise a video-camera 9A or an optical scanner 9B, both connected to an image digitizer 11. Means for displaying the subject image referenced as logic box 14 is a monitor 15. The means for providing contrasts referenced as logic box 16 and for extracting contours referenced as logic box 18 are realized as microcomputer 17. Means for storing primary signals referenced as logic box 12 and contours referenced as logic box 20 are the memory of this microcomputer 17. Means for displaying the contours segments referenced as logic box 24 are also realized by the monitor 15. The microcomputer computer output is connected to an electronic interface 19 feeding an engraving machine 21.

As a convention, the coordinates (xjk, yjk) of a pixel j belonging to a contour k are Cartesian coordinates in reference to the row x of said pixel in a scanning line and to the column y of said line in a column of lines, when said pixel pjk is displayed as a white point on the dark screen (or the reverse) of a monitor associated with the microcomputer used for implementing the method. When the monitor screen comprises, for example 512 lines and 512 pixels in each line, in the memory of the microcomputer used for storing the contours, a series of 512 groups of 512 bits is stored, each pixel signal being a bit addressed by its position in said memory zone i.e., by the column y of its group in said zone and by its row x in said group.

On another hand, in all the following, two bits in the memory zone stored in bit mapping representing a set of contours are said adjacent when their images on the monitor screen are two adjacent pixels, each of such pixels being able to occupy eight positions in relation with the other one. Furthermore, in the following, as a convention, any bit representing a pixel of a contour is a "1" bit.

Figure 2:
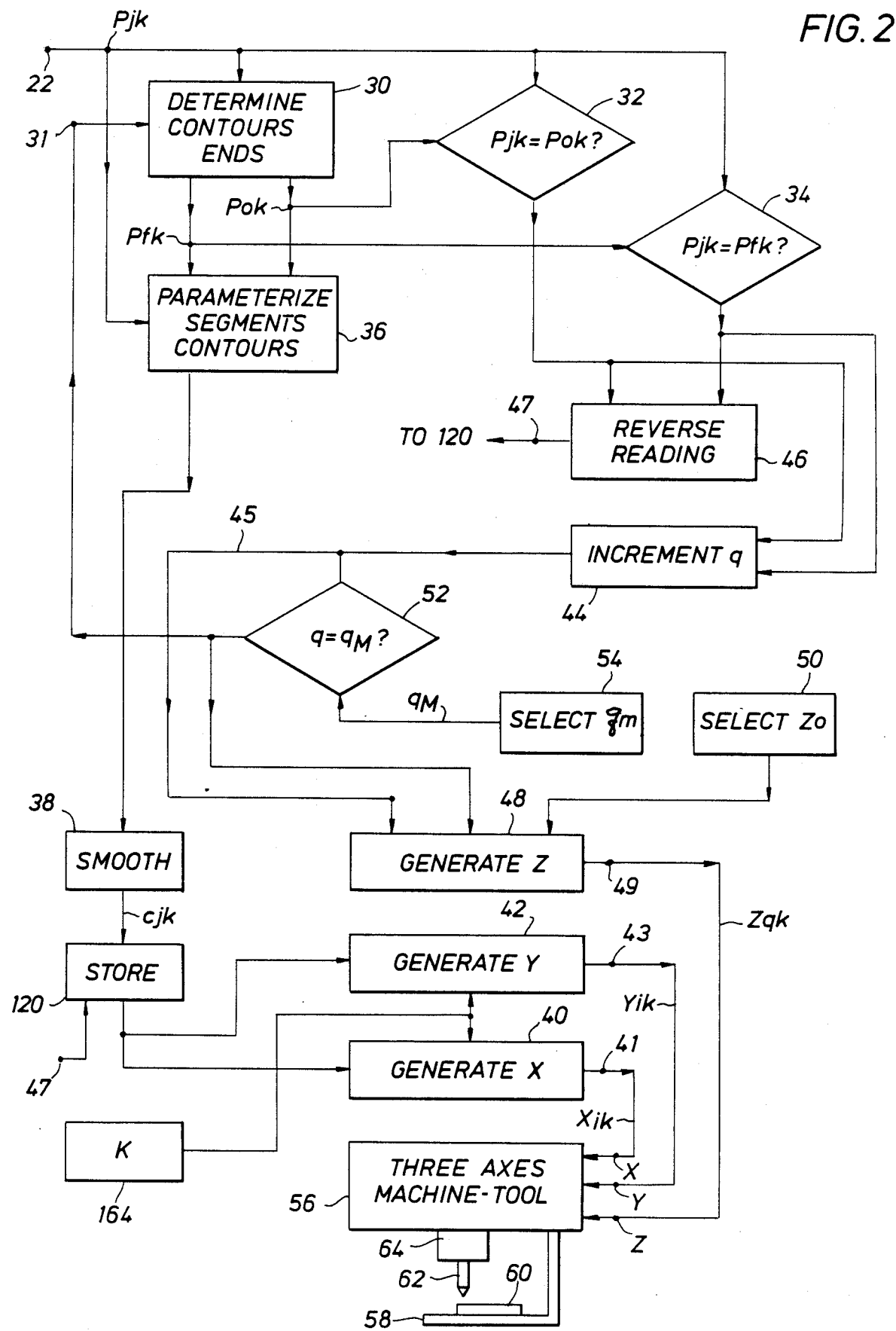
FIG. 2 represents the diagram of the functional stages of the second main phase of the engraving method according to the invention.

According to FIG. 2 representing the second phase of the engraving method of the invention, (the engraving machine is equipped with stepping motors) stage 30 receives from the output 22 of stage 20 the coordinates of the pixels pjk of the k contours to be engraved. This stage 30, "Determine Contours Ends" delivers the coordinates xok and yok of the origin-pixels pok of each the k lines or contours to be engraved as displayed at 24 (FIG. 1). It determines the order in which they are to be engraved and, if necessary, the coordinates xfk and yfk of the final pixels of the open lines. The test stages 32 and 34 (FIG. 2) are designed respectively to respond to the questions "pjk=pok?" and "pjk=pfk?".

Figure 3A:
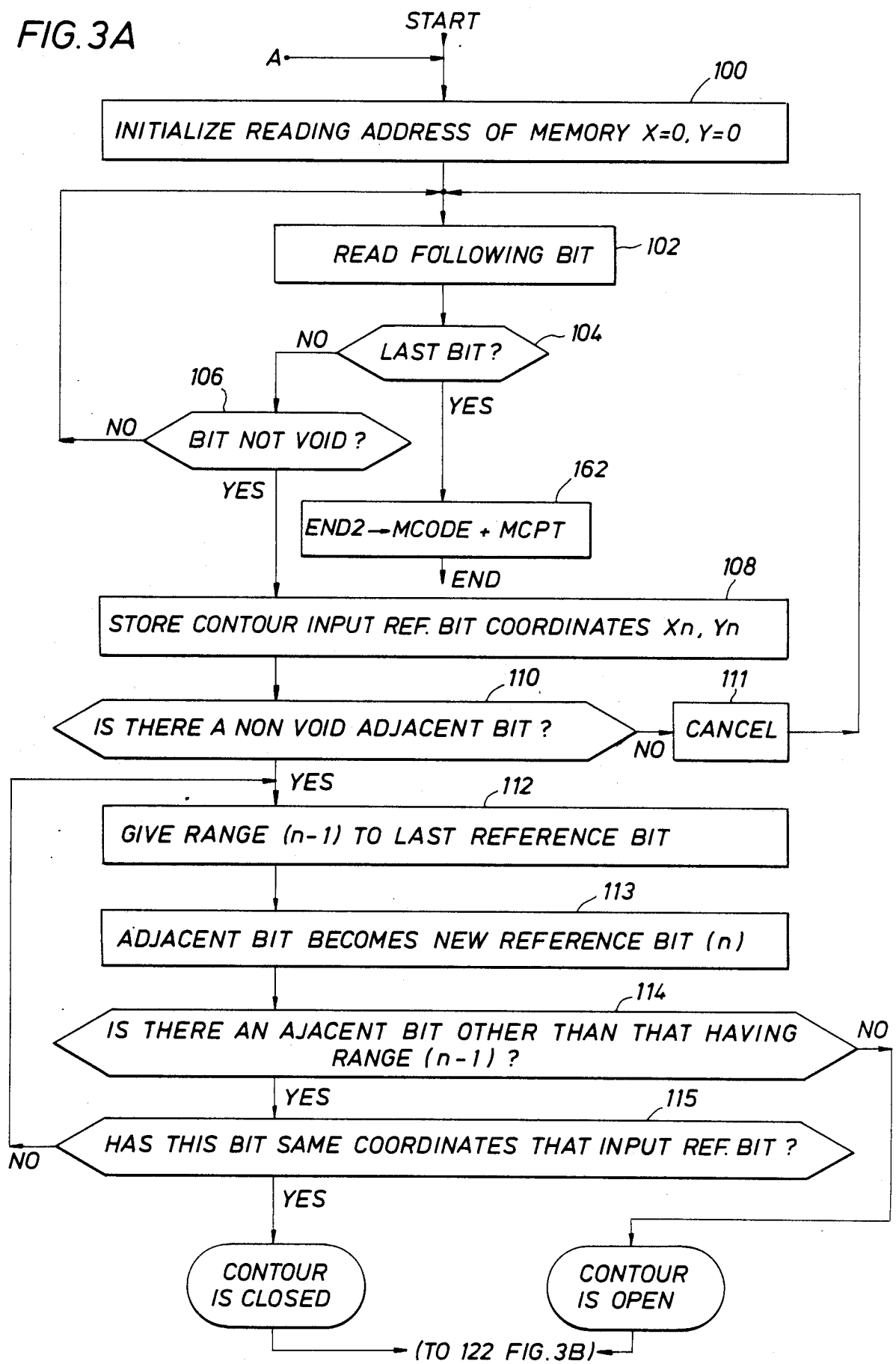
FIGS. 3A, 3B and 3C respectively represent the flow charts of the first, second and third main stages of FIG. 2.

According to FIG. 3A, the flowchart of the main stage 30 "Determine Contours Ends" is shown. It comprises a first function substage 100 "Initialize Reading Address of Memory". In this substage 100, the memory zone referenced as 20 of FIG. 1 is questioned (the origin and the end of this zone in the computer memory—its first and last bits—are determined by the operator). In said zone, the Cartesian coordinates xjk and yjk of all the pixels pjk of the contours are stored.

The next functional substage 102 is "Read Following Bit" in said zone. It is followed by the question substage 104 "Last Bit?" If the answer is NO, the process goes on and the next question substage 106, "Bit not void?" operates. If the answer in this substage 106 is NO, the process goes on again and substage 102 "Read Following Bit" again operates and the following bit in the concerned memory zone is read.

The process repeats itself until a first answer YES is provided in substage 106. When a first bit 1 is sensed, its coordinates (Xn, Yn) are stored in the functional substage 108 "Store Contour Input Bit Coordinates", and this bit becomes the first reference bit (n) in the first contour. After substage 108 is a question substage 110 "Is there a no void adjacent bit?". (A possible implementation of this substage 110 will be shown hereinafter in relation with FIG. 3B). If no adjacent bit is found, functional substage 111 "Cancel" operates. The bit of which the coordinates were just stored in 108 was an isolated point and therefore had to be cancelled. When this is done, the whole process goes back to the input of substage 102 "Read Following Bit".

If an adjacent bit is detected in substage 110, the preceding reference bit takes the range (n−1) in substage 112 and the just found adjacent bit becomes the new reference bit and takes the range (n) in substage 113. In the following substage 114 a question is asked for: "Is there an adjacent bit other than that having the range (n−1)?". If the answer is YES, the following substage 115 asks a new question: "Has this bit the same coordinates as the first reference bit?". If the answer is NO, the process goes back to the input of substage 112 until the answer becomes either NO at the output of substage 114 or YES at the output of substage 115. When the answer is YES at 115, the process returns to the starting point and the contour is a closed one. When the answer is NO at 114, one end of the contour is found and the contour is an open one.

In both cases, the Cartesian coordinates of the last bit so examined in substages 114 and 115 are stored as the origin point pok of the contour k to be engraved.

At the end of the first cycle of operations done by the functional substages 100 . . . 115 of the main stage 30 "Determine Contours Ends", the coordinates (xo1 and yo1) of the origin pixel po1 of the first contour to be engraved are obtained.

Referring again to FIG. 2, the functional stage 36, "Parameterize Contour Segments", comprises two inputs connected respectively to the outputs of stages 20 and 30 furnishing pjk and pok. From the origin-pixel pok of coordinates xok and yok, stage 36 calls successively the current pixels pjk of coordinates xjk and yjk, and then generates the curvilinear coordinates cjk of the j segments of the line or contour of row k. The output of the stage 36 is connected to the input of an intermediate "Smooth" stage 38, then to the input of a memory stage 120 whose output is connected to the inputs of two functional stages 40 ("Generate X") and 42 ("Generate Y"). These two stages also receive from a memory 164 a restitution scale factor K. As a result, they produce, on their respective outputs 41 and 43, two sequences of horizontal displacement control pulses Xik and Yik, depending on the origin-points pok of the contours and of the i couples of directing parameters of the elementary segments of each of the k lines or contours to be engraved.

As a result, every primitive contour segment j becomes a suite of K elementary segments i, each of said elementary segments i corresponding to the elementary displacement step of the engraving machine.

Figure 3B:
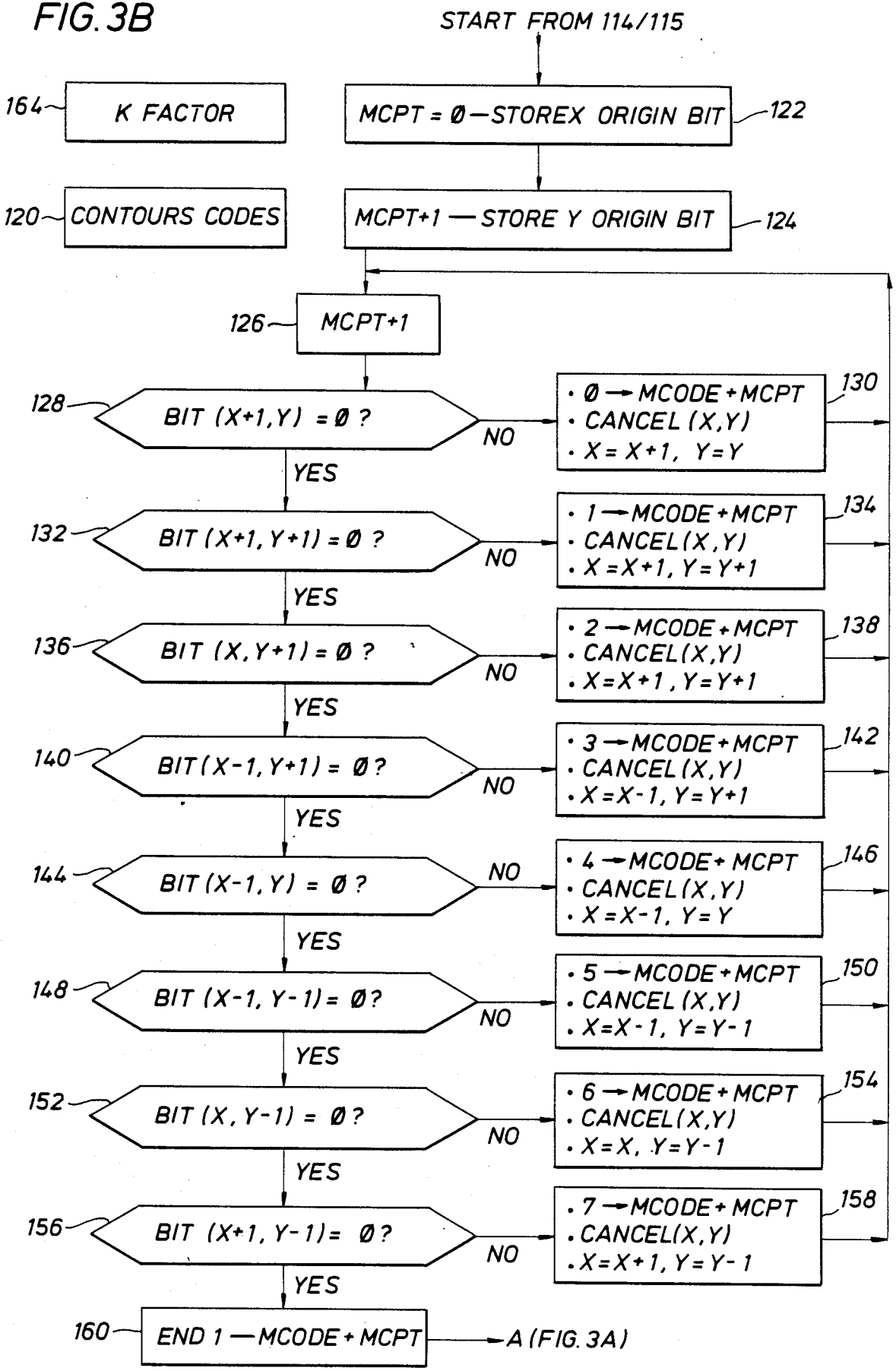
Figure 3C:
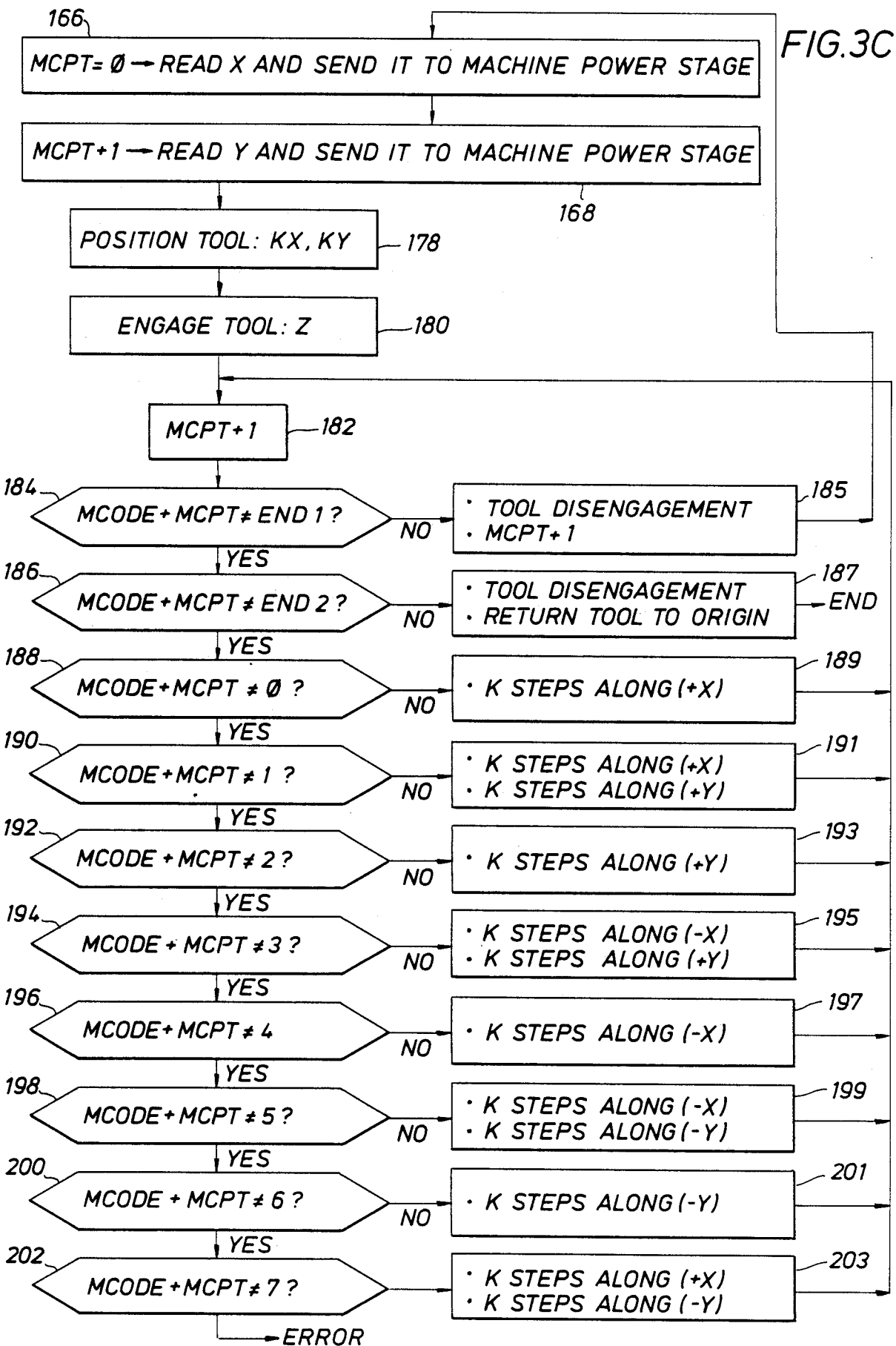

FIGS. 3B and 3C represent the flow chart of substages constituting the main stage 36 "Parameterize Contours Segments". A specific wording is used:

MCODE is the address in the computer memory of the origin of the zone dedicated to the ranging of the codes representing the curvilinear coordinates of the contours pixels.

MCPT is the ranging index of said codes;

END1 is a particular code set at the end of a series of codes defining one contour. It indicates the termination of the engraving process of one among several contours of the concerned image.

END2 is a particular code set at the end of the series of codes defining the last contour of the concerned image. It indicates the termination of the engraving process of all the contours of the concerned image.

According to FIG. 3D, the first two words stored in the zone of the computer memory of which the position is MCODE, are the Cartesian coordinates X=xo1 and Y=yo1 of the origin point po1 of the first contour.

The next word is the code defining the first segment of the contour or, in other words, the direction of the pixel which is adjacent to the origin pixel. Each word which follows is a code defining another segment of the contour. It provides the direction of a given pixel in relation with the pixel which is set before it in the contour, i.e., in relation with the upstream end of the segment.

There are eight direction codes which comprise the following coded numbers: 0, 1, 2, . . . 7. (These codes are called FREEMAN codes from the name of their inventor).

FIG. 3E explains the meaning of each coded number. According to FIG. 3E, an isolated squared group of nine pixels belonging to three successive lines of pixels is displayed on the screen of a monitor. Two reference lines X and Y are associated with this group of pixels.

The central pixel is a reference pixel of which the coordinates are X=0 and Y=0. Around this central pixel are set eight adjacent pixels. From the direction parameters of these eight pixels in relation with the central pixel (X=0, Y=0), i.e., from pairs of unit vectors dx and dy which can have three values (+1), (0) and (−1), FREEMAN defines the eight following directions codes:

0.0 for the pixel (X=+1, Y=0)
0.1 for the pixel (X=+1, Y=+1)
0.2 for the pixel (X=0, Y=+1)
0.3 for the pixel (X=−1, Y=+1)
0.4 for the pixel (X=−1, Y=0)
0.5 for the pixel (X=−1, Y=−1)
0.6 for the pixel (X=0, Y=−1)
0.7 for the pixel (X=+1, Y=−1).

Following the direction code defining the last pixel of a contour on the FIG. 3D, one word END1 or END2 appears. In the first case, a new word X is immediately stored. It is the abscissa of the origin point of a new contour which will be parameterized. In the second case, the end of the operations cycle represented by the main functional stage 36 "Parameterized Contours Segments" is achieved. Each set of data so stored which is terminated by the word END1 or END2 is, in a coded manner, the set of curvilinear coordinates of a given contour. In other words, after an origin point defined by its Cartesian coordinates there is a set of coded numbers defining all the segments of a contour. Each coded number defines the pair of direction parameters of each pixel in relation with that which precedes it in the contour or, in other words, the position of the downstream end of a segment in relation with the position of its upstream end.

According to FIG. 3B, the main functional stage 36 "Parameterize Contours Segments" of FIG. 2 comprises a first substage 122 "MCPT=0 and Store X of Origin Bit". The function of this substage is first to initialize the data ranging address at the beginning of the memory zone 120 dedicated to the curvilinear coordinates of the contours (actually to the contour codes meaning these coordinates). In the computer memory, this memory zone 120 begins at the address MCODE. The other function of this substage 122 is to store the X information of origin bit i.e., the abscissa of the contour origin bit held on at the end of operations done in substages 114 or 115 of FIG. 3A. Then in substage 124, the ranging index is incremented and the function "Store Y of origin bit" is implemented. This Y is the ordinate of the contour origin bit stored at the end of operations performed in substages 114 or 115.

In the next substage 126, the ranging index MCPT is again incremented. In the following substage 128, "Is bit (X+1, Y) void?" is tested the bit having this address in the contours memory zone determined at stage 20 "Store Contours" of FIG. 1. If the bit so tested in that memory zone 20 is a 1 bit representing a contour pixel, an answer NO is provided. Such an answer NO triggers the operation of the associated substage 130.

This substage operates in three ways. First, it stores at the address (MCODE+MCPT) in the memory zone 120 dedicated to the contours codes, the coded number 0. This number corresponds to the direction of the bit (X+1, Y) in relation with the origin bit (X, Y) taken as a first reference or, in other words, to the orientation of the first segment of the contour. The second function of this substage 130 is to set as the new reference bit, the bit which was just tested i.e., (X=X+1, Y=Y). The third function of this substage 130 is to cancel the bit (X,Y) in the memory zone 20 dedicated to the Cartesian coordinates of the contours. A complementary function of this substage is to send back the operating cycle to its starting point, at the input of substage 126 "MCPT+1".

If the answer to the question "Is bit (X+1, Y) void?" asked in substage 128 is YES, the next substage 132 operates. This substage asks the question "Is bit (X+1, Y+1) void?" in the memory zone 20. If the bit having this address in that memory zone is a "1", the answer is NO and the associated substage 134 operates. This substage 134 is similar to substage 130.

For the bit (X+1, Y+1), it operates as substage 130 does for the bit (X+1, Y). It stores at the present address (MCODE+MCPT) in the memory zone 120, the coded number 1 corresponding to the direction of the bit (X+1, Y+1) in relation to the reference bit (X,Y). This provides the orientation of the first segment of the contour. Then it cancels the bit having the address (X,Y) in the memory zone 20 of FIG. 1 and it sets as the new reference bit, the bit which was just tested, i.e., (X=X+1, Y=Y+1). Then, it sends back the operating cycle to its starting point, at the input of substage 126 "MCPT+1".

Following the substage 132 and its associated substage 134, six couples of similar substages are arranged: 136–138, 140–142, 144–146, 148–150, 152–154, 156–158 which successively process the bit having the following addresses in the memory zone 20:(X, Y+1), (X−1, Y+1), (X−1, Y), (X−1, Y−1), (X, Y−1), (X+1, Y−1) in the same way that the two couples of substages 128–130 and 132–134.

When the question substage 156 operates and provides an answer YES to the asked question, the word END1 (which means the end of the set of coded numbers defining a contour) is entered by substage 160 at the address (MCODE+MCPT) in the memory zone 120. This first operation cycle being terminated, another one resumes for the second contour. For that, the operating cycle is sent back in A at the input of substage 100 of FIG. 3A.

During this first operating cycle, all the bits defining the first contour coordinates stored in memory zone 20 are cancelled. So, during the next operating cycle of substages 100 . . . 115 of the main stage 30 "Determine Contours End", the input reference pixel of the second contour to be engraved is determined and its Cartesian coordinates are held on for the next step. During the operating cycle of substages 121 . . . 160 of the main stage 36 "Parameterize Contours Segments", the curvilinear coordinates of the second contour are determined and stored in a coded way in the memory zone 120, and the bits defining this second contour previously stored in bit mapping memory zone 20 are cancelled.

The whole process repeats itself until the last bit of the memory zone 20 is questioned where the Cartesian coordinates of the contours were stored. When the question substage 104 "Last Bit?" of FIG. 3A answers YES, the substage 162 operates and the word END2 (which means the end of the whole function "Parameterize Contours Segments" referenced as logic box 36 of FIG. 2) is entered in the memory zone 120 and stored at the range (MCODE+MCPT).

To the whole set of contours codes so determined in stage 36 and stored in memory zone 120, a complementary datum is associated which is the restitution factor K. This factor K is entered by the operator and stored apart in memory 164 on FIG. 3B, which may be used in combination with the contours codes to generate displacement orders for the engraving tool or the blank to be engraved.

Each of the data so stored in memory zone 120 is successively called by the next functional stage and combined with that stored in 164 in order to generate the curvilinear coordinates Cik of the i elementary segments of the contour k to be actually engraved. Each of the elementary segments represents one elementary displacement step of the engraving machine.

From the flowchart of the elementary functions implemented by the substages 122 . . . 160 of FIG. 3B, it is easy to build up the flowchart of the elementary functions implemented by the question stage 110 "Is there a non void adjacent bit?" of FIG. 3A. In this substage 110, eight substages similar to the eight elementary substages 128-132-136-140-144-148-152-156 of FIG. 3B are used. The associated substages 130-134-138-142-146-148-150-154 and 158 are disregarded. Each of the NO outputs of said similar substages is applied to the input of substage 112 of FIG. 3A and the YES answer of the last substage similar to 156 is applied to the input of substage 111 "Cancel" of FIG. 3A.

Referring again to FIG. 2, when several engraving passes are needed, the output (Yes) of the test stage 34 "pjk=pfk?" is connected, on the one hand, to the first input of a functional stage 44 "Increment q" (the number q being the row of the engraving passes) and, on the other hand, to the first input of a functional stage 46 "Reverse Reading" whose output 47 is connected to an auxiliary input of memory 120 (FIG. 3B). The output (Yes) of the test stage 32 "pjk=pok?" is connected to the second input of the stage 44, and to the second input of stage 46.

This stage 44, "Increment q", includes an output connected to one of the three inputs of the functional stage 48 "Generate Z". Another input of stage 48 is connected to the output of a functional stage 50, "Select $Z_o$", placed at the disposal of the operator. On output 49 of stage 48 appears a sequence of pulses Zqk controlling the engraving depth.

The output of stage 44 "Increment q" is also connected to the first input of a test stage 52 "q=qM?" having a second input connected to the output of a stage 54 "Select qM" placed at the disposal of the operator. The output of the test stage 52 is connected to the automatic selection input 31 of stage 30 "Determine Contours Ends" and to input 53 of stage 48 "Generate Z". Input signal on lead 31 controls the positioning of the engraving tool 62 at a distance $Z_o$ above a blank 60. Outputs 41, 43, 49 of the three stages "Generate X,Y,Z" are connected respectively to the inputs X,Y,Z of the three power control stages of a numerically controlled precision machine-tool with three displacement axes 56, such as the one manufactured by the Italian company Cortini (Model L300).

The machine 56 is equipped with a horizontal table 58 designed to move longitudinally and transversely. On this table 58 is mounted a fixed rectangular blank 60. The machine 56 is moreover equipped with a vertical-displacement engraving tool comprising a milling cutter 62 able to produce thin strokes and a rotational drive motor 64.

FIG. 3C describes in detail the preferred way to implement the functional stages "Generate X", "Generate Y" 40, 42 and their associated stages 44 . . . 54 which utilize the curvilinear coordinates Cjk.

When substage 162 "END2" of FIG. 3A operates, the main functional stages 30 and 36 (FIG. 2) have achieved their duty and the operator can then apply a trigger signal to the inputs of stages 40, 42 "Generate X-Y" of FIG. 2. According to FIG. 3C, when such a trigger signal is produced, substage 166 "MCPT=0" operates and the reading index MCPT tests the range (MCODE+MCPT) of the memory zone 120 where the contours codes are stored. The datum stored at the concerned range is X=xo1, the abscissa of the origin point of the first contour to be engraved; this datum being read is then transferred to the power stage (X) of the engraving machine 56. This being done, substage 168 operates and the reading index MCPT is again incremented. The datum stored in this new range of the memory zone 120 is Y=yo1 the ordinate of the origin point of the first contour. This datum being read is transferred to the power stage (Y) of the engraving machine 56.

This being done, the two power stages of functional stages 40–42 of FIG. 2 which also receive the K factor from store 164, are able to provide the stepping motors X and Y (not shown) of the engraving machine 56 with two sequences of control pulses Xi1 and Yi1. This operation is symbolized by the functional stage 178 "Position Engraving Tool". In answer to these control pulses, the two stepping motors respectively advance by the number of elementary steps K.xo1 and K.yo1. Following these two combined displacements, the engraving tool 62 is set just above the origin point of the first contour.

Then, the next functional substage 180 "Engage Tool" operates. The machine 56 receives from stage 48 "Generate Z" of FIG. 2 a series of control pulses which cause the tool to move in the Z direction and to engage the blank 60 to be engraved.

In the following substage 182, the reading index MCPT is again incremented and the range (MCODE+MCPT) of the memory zone 120 is questioned. In the next substage 184, a question is asked: "(MCODE+MCPT)=END1?". (The sign = means different). For an engraving operation which starts, the answer is YES. Then a similar second question is asked in substage 186: "(MCODE+MCPT)=END2?". Again for an engraving operation which starts, the answer is YES. Questions related to the curvilinear coordinates of the first segment of the first contour to be engraved can immediately be asked. The questions which can be asked are eight. They are expressed by the following question substages:

.In 188: (MCODE+MCPT)=0?
.In 190: (MCODE+MCPT)=1?
.In 192: (MCODE+MCPT)=2?
.In 194: (MCODE+MCPT)=3?
.In 196: (MCODE+MCPT)=4?
.In 198: (MCODE+MCPT)=5?
.In 200: (MCODE+MCPT)=6?
.In 202: (MCODE+MCPT)=7?

For each YES answer to each of these questions asked in the eight question substages 188, 190, . . . 202, the next substage operates and the next question is immediately asked. The last substage 202 indeed does not comply with this rule. If this substage 202 answers YES, something is wrong, and the sign ERROR appears and the whole system stops.

When an answer NO is provided by one of these question substages 184 . . . 202, its associated instruction substage 185 . . . 203 operates. These instructions are the following:

| In 185: | Disengagement of Tool<br>Return to process origin |
|---|---|
| In 187: | Disengagement of Tool<br>Return to tool position origin<br>Stop order to System |
| In 189: | K positive displacement steps along X axis<br>Return to cycle input B (substage 182) |
| In 191: | K positive displacement steps along X axis<br>K positive displacement steps along Y axis<br>Return to cycle input B |
| In 193: | K positive displacement steps along Y axis<br>Return to cycle input B |
| In 195: | K negative displacement steps along X axis<br>K positive displacement steps along Y axis<br>Return to cycle input B |
| In 197: | K negative displacement steps along X axis<br>Return to cycle input B |
| In 199: | K negative displacement steps along X axis<br>K negative displacement steps along Y axis<br>Return to cycle input B |
| In 201: | K negative displacement steps along Y axis<br>Return to cycle input B |
| In 203: | K positive displacement steps along X axis<br>K negative displacement steps along Y axis<br>Return to cycle input B. |

FIGS. 4A, 4B and 4C represent three types of medals that can be produced using the automatic engraving method according to FIGS. 1 and 2.

With reference to FIG. 1, a review will be made of the two embodiments of the "Produce Primary Signals" functional stage 10.

The first of these embodiments consists in using an optical scanner 9B (See FIG. 1A). Such a scanner comprises essentially a scanning bar made up of high-density photosensitive elements (from four to sixteen elements per millimeter depending on the models currrently available on the market) and a stepping motor designed to drive the support of the image to be scanned, such that the successive image scanning lines have a density per millimeter comparable to that of the photosensitive elements of the bar. With this bar is associated a built-in analog/digital converter designed to produce a series of digital signals (with five digits generally) respectively representative of the brightness of the pixels of the image placed successively opposite the photosensitive elements of the bar.

The second of these embodiments of stage 10 consists in entering the image of the subject concerned by means of a video camera 9A (FIG. 1A) associated with an image digitizing device. (If no photograph of the subject is available, the subject can be placed in front of the camera beforehand.) The standard analog output signal from such a camera has 625 lines, with each line lasting 64 microseconds. In the image digitizing device, the number of samples per line is generally 512 and the number of gray levels is 64, the level 0 being black and the level 63 white. A video tape recorder can obviously be used as an intermediary between the video camera and the associated image digitizing device.

In both cases, each of the y primary series of digital signals representative of the lines of pixels of the useful image successively analyzed by the image acquisition equipment used includes a marker signal and a given number x of digital signals. The value "Gxy" of each of these digital signals is that of the gray level of the pixel of column x in the primary series of row y.

The "Store Primary Series" functional stage 12 (FIG. 1) uses an interface card and a memory, the card being designed to give the input digital signals the format required by the memory of the computer 17 (FIG. 1A) used for the execution of the functional phases of the method according to the invention.

The function for producing secondary series of signals representative of at least one distinctive line of the image of the subject, according to the automatic engraving method of the invention, is performed by the stages 14 to 18 of FIG. 1. It is implemented by a computer (such as a Victor V286) equipped with an application software having the functions described hereinafter in detail. For this purpose, the operator first displays on the screen of his monitor (stage 14) the image represented by the primary series of digital signals stored at 12.

If this image is a profile set off against a light background, the operator chooses for the threshold a gray level slightly darker than the background of the image (stage 16) so as to obtain maximum contrast. A binary comparison is then then carried out and all digital signals having values lower than the threshold thus set are replaced by a binary 1 pixel signal and all those with values higher than the threshold are replaced by a binary 0 pixel signal (or vice versa).

If the picture is taken from any angle, another solution is possible for the "Provide Contrasts" functional stage 16. It will consist in setting as the contrast threshold a predetermined gray level taken from the useful image of the subject to be represented. Again, a binary comparison is carried out: only the darkest gray levels will be taken; the values of the digital signals adopted will be replaced by a binary 1 pixel signal and those of the eliminated signals by a binary 0 pixel signal (or vice versa). The image to be represented will then be made up of dark zones and light zones which overlap more or less. When this contrasted image is to be used as a stylized image to be cut out, the operator will give instructions to the computer so that the heterogeneous zones (zones to be cut out having at least one zone to be conserved) initially obtained are divided into homogeneous zones to be cut out.

When either of the preceding operations has been completed, the computer under control of the operator will look for the transitions of the image signals in order to extract the contours of this image (stage 18). For this purpose, several techniques can be used. Specific circuits or software may be employed. One of these techniques is to eliminate all the pixels (1) which are surrounded by eight adjacent pixels (1). A software flowchart derived from that described in FIG. 3B may be used. As an example, on FIG. 3E representing an isolated squared group of nine pixels, the central pixel would be eliminated. The eight peripheral pixels are transition pixels (at least one of their adjacent pixels is a "0" bit) which together form a squared contour. Each side of this contour is made of two primitive segments and each of such segments connects two adjacent pixels.

Such transition bits form a bit mapping which represents the primitive pixels of the lines delimiting one or more distinctive contours of the image to be engraved. The Cartesian coordinates xjk and yjk of these primitive pixels are stored in bit mapping in a buffer memory (stage 20) and displayed at 24 on the screen of the monitor 15 to show the primitive segments of each line k to be engraved.

When the image is taken from any angle, a second approach is also possible. It will consist in differentiating the primary series of signals representative of the grays of the image and then keep only the resulting signals exceeding a given threshold. To accomplish this, the gray digital signals stored at 12 will be processed at 16 so as to keep in each primary series only the pixel signals having in relation to at least one of their eight adjacent pixel signals a difference in grey levels greater than a predetermined value. Then, in stage 18 "Extract Contours", signals so selected are transformed into transition binary signals which in turn are grouped in continuous lines or contours as indicated hereinabove. From the foregoing, the "Extract Contours" stage 18 produces a succession of k secondary series composed of binary pixel signals (bits "1") which are two by two adjacent and this succession is representative of the coordinates xjk and yjk of the j end pixels of the primitive segments of the k lines or contours constituting the distinctive features of the subject to be represented. If those lines or contours are closed lines to be cut out, the operator will divide them into at least two successive open lines or contours.

It will be noted here that the equipment used for the implementation of the first phase of the automatic engraving method according to the invention, the functional stages of which are represented in FIG. 1, can be located far from that used for implementing the second, represented in FIG. 2. In other words, the image acquisition studio may be located in a town and the shop manufacturing the object concerned may be in another town. For this purpose, the data pjk available on output 22 of the memory 20 are transmitted by telephone line to reception equipment installed in said shop, this equipment having at its input another "Store Contours Segments" functional stage 20.

The contours pixels pjk being displayed at 24 on the screen of the monitor, the computer chooses (stage 30 of FIG. 2) those (pok) which will be taken as the respective origins of the lines or contours to be engraved. The origin pixel pok of the line or contour of row k has the coordinates xok and yok, its reference and that of the current pixels pjk being for example the front left-hand corner of the rectangular blank 60 mounted on the machine-tool 56.

The j pairs of coordinates of the contour pixel signals pjk constituting the k lines or contours to be engraved, delivered by the stages 22, are called up one after the other by the "Parameterize Contours Segments" functional stage 36. Two adjacent transition signals can come either from the same or from two successive primary series (See FIG. 3E). In both cases, the interval between them corresponds to the longitudinal and/or transverse primitive resolution of the lines or contours to be engraved, such primitive resolution being generally very different from the resolution of the machine-tool 56, which is the elementary longitudinal or transverse displacement step applied to the blank or the tool. Consequently, each primitive segment joining two adjacent transition pixel signals pjk stored at 20 has to be transformed into several standard elementary segments corresponding to the elementary horizontal movements (dx and/or dy) of the machine-tool 56. The state 36 "Parameterize Contours Segments" then calculates the directing parameters of the segments of the different lines or contours. These directing parameters are constituted by the combination of unit vectors dx and dy, each capable of taking on three values: $-1$, $0$ and $+1$.

Immediately thereafter, these curvilinear coordinates are applied to the functional stage 38 "Smooth", wherein any downstream pixel signal defining a new segment not making an acute angle with the direction of the previous segment is cancelled.

After coding and smoothing, these parameters are stored in memory zone 120 as explained hereinbefore in describing the operation of substages 121 . . . 160 constituting the main stage 36.

It will be noted that the functional stage 38 "Smooth" is useless when the definition of the scanning device (video camera or optical scanner) is high enough.

Consequently, the Cartesian coordinates xjk and yjk of the j end pixels of the primitive segments of each line or contour of row k stored at 20 are transformed in the "Parameterize Contour Segments" stage 36 into curvilinear coordinates defining each segment of each line or contour from the reference pixel on the blank and then from the origin pixel pok of each line or contour. These curvilinear coordinates are then combined with a restitution scale factor K in order to produce engraved lines or contours of the required dimensions. These curvilinear coordinates are routed to the stages 40 and 42 ("Generate X and Y") which, for each line or contour of row k, consequently deliver on their outputs 41 and 43 two sequences of pulses Xik and yik controlling the machine-tool 56, the letter i meaning that each pulse moves the tool or the blank by one elementary displacement step (so one primitive segment j comprises K·i steps).

To generate and then process these data, the operator first sets the milling cutter 62 and the blank 60 in their reference positions. For this purpose, he gives the computer associated with the machine-tool 56 the instructions necessary so that the tip of the milling cutter 62 just grazes the reference point of the blank 60. The operator then actuates the computer for the processing defined in the functional stages described above and then the operations of the machine-tool 56 for the automatic engraving of the distinctive features of the representation involved.

Initially, the cutter 62 moves away from the blank 60, to the distance zo, and the table 58 carrying this blank 60 moves from its starting position (the cutter is then aligned with the reference pixel, i.e., the front left-hand corner of the blank for the first line or contour, and the last engraved point of the preceding line or contour for the next one) up to the origin point pok of the line or contour of row k. When this operation is completed, the projection of the cutter 62 on the blank 60 is the origin point of the line or contour to be engraved. The next engraving phase can then begin. The cutter 62 is lowered and engages the blank 60, as will be described in greater detail below, and from the origin point (xok, yok) the blank 60 will move in the X and Y axes under the action of the stepping motors giving the horizontal movement of the machine-tool 56 of FIG. 2 or the engraving machine 21 of FIG. 1A. These motors, supplied by their respective power stages as the electronic interface 19 of FIG. 1A move by one step, in either one direction or the other, for each +1 or −1 pulse received by said stages, following one by one each of the elementary segments joining the smoothed standard pixels pik and which together constitute the line or contour of row k to be engraved. Because of the smoothing of the curvilinear coordinates, lines engraved and contours cut in the blank are free of any asperities which would negatively affect their appearance.

The "Generate Z" stage 48 delivers a sequence of engraving depth control pulses $Zqk = zo + dz(q,c)$ for the stepping motor providing the vertical displacement of the cutter 62 of the machine-tool 56. This stage 48 adds to the number zo of pulses which, from a given distance, bring the cutter 62 to graze the blank 60, a number c of pulses (+1) representative of the elementary milling depth c.dz of the cutter 62 in the blank 60 which corresponds to an engraving pass. When the motor 64 driving the cutter 62 has been started up, the stepping motor giving the vertical movement of the machine 56 receives a first number zo and then a second number c of pulses (+1). The cutter 62 is lowered, comes into contact with the blank 60 and then cuts down to a depth of c.dz.

In the case of an open line, such an engraving pass is pursued as long as the stage 34 "pik=pfk?" does not deliver a Yes response. When the stage 34 delivers such a response at its output (actually when substage 185 of FIG. 3C operates) and when several engraving passes are planned, an instruction is applied to the "Increment q" and "Reverse Reading" stages 44 and 46 respectively. Stage 44 then sends (link 45) to the "Generate Z" stage 48 an instruction to produce a new series of c pulses (+1) corresponding to a new elementary cutting depth c.dz of the cutter 62 into the blank 60. For its part, the "Reverse Reading" stage 46 sends to the memory 120, where Segments Codes are stored, an instruction to actuate the reversal of the calling of these codes (See FIG. 3D).

A new engraving pass begins and the cycle begins again until the test 52 "q=qM?" delivers a Yes response. When the maximum number qM of engraving passes set by the operator has been reached, the "Generate Z" stage 48 receives on its input 53, (again from substage 185 of FIG. 3C) a command for the withdrawal of cutter 62, and the entire engraving process relative to the line or contour concerned is stopped. If this number qM is sufficiently high, a cut will be made. The process for engraving the next line or contour then begins immediately.

If the line to be engraved is closed, the test stage 34 and the "Reverse Reading" stage 46 are disabled and only the test stage 32 "pik=pok?" and the "Increment q" stage 44 are active. The stage 32 produces a Yes response when the cutter 62 has come back to the starting point and, at that moment, the stage 44 increments q by one unit: a new engraving pass then begins, as in the case of an open line.

The whole function "Generate Z" is indeed useless when the engraving tool is a laser beam or an electro-erosion device.

This description of the main features of the embodiments of the automatic engraving method according to the invention shows the relative simplicity of the tasks to be carried out by the operator and the instructions to be given to the computer. It is also noted that no artistic skills are required of the operator for the immediate production, from a flat blank, of an ornamental or utility object bearing the faithful representation of the distinctive features of any subject proposed by a customer, such as a profile (FIG. 4A), contrasts (FIG. 4B) or distinctive lines (FIG. 4C).

The invention is not limited to the embodiments of the automatic engraving method described above.

It will be noted, in particular, that the examples described concern the basic techniques used for the automatic engraving of small ornamental or utility objects with the faithful representation of the distinctive features of a given subject: the external contours, the contrast zones and the distinctive lines. It is of course possible, within the framework of the invention, to combine them or to complete them. For example, it is possible to engrave or cut out a profile or a contour and to engrave either parallel lines of a given width to distinguish one from another having another tone, or the distinctive lines of the subject. It will be noted that in using a curvilinear coordinates memory 120, a separation is made between the time of producing the engraving data and the time of using the same for the engraving operation. This makes it possible, in using two micro-computers, to have for each operation a specialized category of personnel when the objects concerned must be produced in relatively large quantities.

It will also be noted that while the invention deals primarily with automatic engraving methods, it also concerns any similar process and also the equipment to be used for implementing these methods and the ornamental and utility objects manufactured according to these methods.

I claim:

1. A method for producing objects having the faithful representation of the distinctive features of a given subject image, said method using at least a microcomputer, a monitor and a numerically controlled machine having at least X and Y displacement axes, said machine being fitted with tool means producing thin strokes and with a blank to be processed, said method comprising the steps of:
    producing and storing bit mapping signals on the screen of said monitor representing the Cartesian coordinates of the various points of distinctive lines of said subject image;
    identifying the origin point of one of said distinctive lines and storing apart its Cartesian coordinates;
    from the Cartesian coordinates of said origin point, processing the other Cartesian coordinates signals of said one distinctive line so as to produce a sequence of curvilinear coordinates signals representative of the successive segments of said one distinctive line as displayed on said monitor screen;
    combining a restitution scale factor with said sequence of curvilinear coordinates signals so as to produce a continuous dual sequence of X and Y control pulses for said numerically controlled machine;
    applying said dual sequence of X and Y control pulses to said machine, thereby producing two sequences of elementary relative displacements of said blank and of said tool and so generating one distinctive line of said distinctive line on said blank; and
    renewing the four previous foregoing steps for the other distinctive lines of said representation.

2. The method of claim 1, wherein the step of producing signals on the screen of a monitor representing the Cartesian coordinates of the various points of the distinctive lines of a subject image comprises the following sub-steps;
    scanning the image of the subject concerned, thereby producing a primary series of digital signals representative of the grey levels of the lines of pixels of the scanned image and storing said primary series of signals; and
    producing binary transition signals corresponding to particular transitions of the grey levels of said primary series in order to extract their distinctive lines and contours, thereby producing secondary series sets of signals representing bit mapping of said Cartesian coordinates.

3. The method of claim 2 wherein, with the distinctive featured of the subject image being defined by the contours of the main contrast zones of said image, the production of said binary transition signals comprises the substeps of:
    comparing the signals of said primary series with a threshold consisting of a predetermined grey level taken from said primary series and producing binary signals representing the result of this operation; and
    selecting the transition signals included in said binary signals, thereby extracting the contours of said subject image.

4. The method of claim 2 wherein, with the distinctive features of the subject image being constituted by the distinctive lines and contours of said image, the production of said binary transition signals comprises the following substeps:
    selecting in said primary series distinctive signals exhibiting in relation to at least one of their eight adjacent signals on said monitor screen, a grey level difference greater than a predetermined value; and
    converting into said binary transition signal each of said distinctive signals, thereby extracting the distinctive lines and contours of said subject image.

5. The method of claim 1 wherein said numerically controlled machine is a machine-tool having X, Y and Z displacement axes and said tool means is a fine engraving tool, said method further comprising the step of producing discontinuous sequences of control pulses for controlling the Z elementary relative displacements of said blank and of said engraving tool for determining the engraving depth of each of said distinctive lines or contours.

6. The method of claim 5 wherein said object being a cut out, the production of said three sequences of control pulses comprises the following step:
    renewing said three sequences for each new engraving pass when the origin point or end of line point of a distinctive line is found, said renewing step being reversed when said line is open.

7. A system for the automatic making of objects having the faithful representation of the distinctive features of a given subject, comprising:
    (1) a numerically controlled precision machine having at least X and Y displacement axes, said machine being equipped with tool means producing thin strokes and with a blank to be processed;
    (2) means for scanning the image of said subject and means for producing primary series of digital signals representative of the grey levels of the lines of pixels of the scanned image;
    (3) a monitor having a screen;
    (4) a programmed microcomputer including:
        (a) means for storing said primary series of digital signals;
        (b) means for producing particular transitions of the grey levels of said primary series;
        (c) means for converting said transitions into binary signals so as to form secondary series of two by two adjacent signals respectively representing on the screen of said monitor the Cartesian coordinates of the ends of the primitive segments of the distinctive lines and contours to be represented;

(d) means for storing in bit mapping said secondary series;

(e) means for identifying the origin pixel of each of said distinctive lines or contours and means for storing apart the Cartesian coordinates of said origin pixel;

(f) means for processing said origin pixel Cartesian coordinates together with the other Cartesian coordinates signals of said secondary series so as to produce sequences of curvilinear coordinates signals representative of the successive primitive segments of said lines or contours and means for storing said sequences;

(g) means for storing a restitution scale factor;

(h) means for combining said scale factor with the curvilinear coordinates of the primitive segments of each distinctive line or contour to be represented so as to produce continuous sequences of control pulses for said machine; and (5) means for applying said control pulses to said machine so as to produce the elementary relative X and Y displacements of said blank and of said tool.

* * * * *